(12) United States Patent
Krause

(10) Patent No.: US 10,016,846 B2
(45) Date of Patent: Jul. 10, 2018

(54) SYSTEM, METHOD, AND APPARATUS FOR REPAIR OF COMPONENTS

(75) Inventor: Gregory Thomas Krause, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 1066 days.

(21) Appl. No.: 12/637,414

(22) Filed: Dec. 14, 2009

(65) Prior Publication Data
US 2010/0170878 A1 Jul. 8, 2010

Related U.S. Application Data

(63) Continuation-in-part of application No. PCT/US2008/007483, filed on Jun. 12, 2008.

(60) Provisional application No. 60/934,257, filed on Jun. 12, 2007.

(51) Int. Cl.
| | |
|---|---|
| B23K 26/00 | (2014.01) |
| B23K 26/34 | (2014.01) |
| B23P 6/00 | (2006.01) |
| F01D 5/00 | (2006.01) |
| B23K 35/32 | (2006.01) |
| B23K 26/32 | (2014.01) |

(Continued)

(52) U.S. Cl.
CPC .............. *B23K 26/34* (2013.01); *B23K 26/32* (2013.01); *B23K 35/325* (2013.01); *B23P 6/007* (2013.01); *F01D 5/005* (2013.01); *B23K 2201/001* (2013.01); *B23K 2203/14* (2013.01)

(58) Field of Classification Search
CPC . B23K 26/00; B23K 26/0054; B23K 26/0057

USPC ..... 219/76.1, 121.11, 121.15, 121.16, 121.6, 219/121.63, 121.64
See application file for complete search history.

(56) References Cited

U.S. PATENT DOCUMENTS

| | | |
|---|---|---|
| 4,804,815 A | 2/1989 | Everett |
| 4,992,643 A | 2/1991 | Fuerschbach et al. |
| 5,038,014 A | 8/1991 | Pratt et al. |

(Continued)

FOREIGN PATENT DOCUMENTS

CN 1714892 A 1/2006

OTHER PUBLICATIONS

International Search Report and Written Opinion, PCT/US2008/007483, dated Sep. 19, 2008, Rolls-Royce Corporation.

(Continued)

*Primary Examiner* — Dana Ross
*Assistant Examiner* — Ayub Maye
(74) *Attorney, Agent, or Firm* — Brinks Gilson & Lione

(57) ABSTRACT

A method is disclosed including operations for repairing a component. The method includes providing a component including one of titanium and a titanium alloy, providing a laser deposition device, and providing a shielding means that ensures an oxygen content remains below a first threshold and that a water vapor content remains below a second threshold in a target area of the component. The method further includes depositing a metal material on the component, where the depositing includes operating the deposition device along a tool path including a plurality of tool passes, wherein the tool path further comprises a deposition device velocity specification, a laser power specification, and a specified delay time between each of the plurality of tool passes.

34 Claims, 6 Drawing Sheets

(51) Int. Cl.
*B23K 101/00* (2006.01)
*B23K 103/14* (2006.01)

(56) References Cited

U.S. PATENT DOCUMENTS

| | | | |
|---|---|---|---|
| 5,118,026 A | 6/1992 | Stacher | |
| 5,554,837 A | 9/1996 | Goodwater et al. | |
| 5,584,663 A * | 12/1996 | Schell | B23K 26/0853 148/428 |
| 5,889,254 A | 3/1999 | Jones | |
| 5,993,554 A | 11/1999 | Keicher et al. | |
| 6,046,426 A | 4/2000 | Jeantette et al. | |
| 6,066,285 A | 5/2000 | Kumar | |
| 6,122,584 A * | 9/2000 | Lin et al. | 701/70 |
| 6,154,959 A | 12/2000 | Goodwater et al. | |
| 6,172,327 B1 | 1/2001 | Aleshin | |
| 6,203,861 B1 | 3/2001 | Kar et al. | |
| 6,238,614 B1 | 5/2001 | Yang et al. | |
| 6,269,540 B1 | 8/2001 | Islam et al. | |
| 6,326,585 B1 | 12/2001 | Aleshin et al. | |
| 6,391,251 B1 | 5/2002 | Keicher et al. | |
| 6,405,095 B1 | 6/2002 | Jang et al. | |
| 6,429,402 B1 | 8/2002 | Dixon et al. | |
| 6,476,343 B2 | 11/2002 | Keicher et al. | |
| 6,495,793 B2 | 12/2002 | Tewari | |
| 6,504,127 B1 | 1/2003 | McGregor et al. | |
| 6,505,089 B1 | 1/2003 | Yang et al. | |
| 6,621,039 B2 | 9/2003 | Wang et al. | |
| 6,727,459 B1 | 4/2004 | Bialach | |
| 6,756,561 B2 | 6/2004 | McGregor et al. | |
| 6,811,744 B2 | 11/2004 | Keicher et al. | |
| 6,823,230 B1 | 11/2004 | Jamalabad et al. | |
| 6,872,912 B1 | 3/2005 | Wos et al. | |
| 6,908,288 B2 | 6/2005 | Jackson et al. | |
| 6,940,037 B1 | 9/2005 | Kovacevic et al. | |
| 6,972,390 B2 | 12/2005 | Hu et al. | |
| 6,989,507 B2 | 1/2006 | Clark | |
| 7,073,561 B1 | 7/2006 | Henn | |
| 7,115,503 B2 * | 10/2006 | Im | H01L 21/76838 257/E21.582 |
| 7,220,935 B2 * | 5/2007 | Ireland et al. | 219/74 |
| 7,797,828 B2 * | 9/2010 | Beeson | B23P 6/007 29/888 |
| 2001/0025418 A1 | 10/2001 | Femihough et al. | |
| 2002/0091459 A1 | 7/2002 | Meier | |
| 2002/0148817 A1 | 10/2002 | Tewari | |
| 2002/0168466 A1 * | 11/2002 | Tapphorn et al. | 427/180 |
| 2004/0020625 A1 * | 2/2004 | Mazumder | 164/46 |
| 2004/0173946 A1 | 9/2004 | Pfeifer et al. | |
| 2004/0191064 A1 | 9/2004 | Guo | |
| 2005/0015980 A1 | 1/2005 | Kottilingam et al. | |
| 2005/0152805 A1 | 7/2005 | Arnold et al. | |
| 2005/0166397 A1 | 8/2005 | Ng | |
| 2005/0173379 A1 | 8/2005 | Ireland et al. | |
| 2005/0194363 A1 | 9/2005 | Hu et al. | |
| 2005/0241147 A1 | 11/2005 | Arnold et al. | |
| 2005/0274010 A1 | 12/2005 | Rawson et al. | |
| 2006/0049153 A1 * | 3/2006 | Cahoon | B23K 26/03 219/121.63 |
| 2006/0054079 A1 | 3/2006 | Withey et al. | |
| 2006/0228465 A1 * | 10/2006 | Zurecki | C21D 1/613 427/8 |
| 2006/0236765 A1 * | 10/2006 | Bouet et al. | 73/577 |
| 2007/0264523 A1 * | 11/2007 | Hu | C22C 19/058 428/636 |
| 2008/0018230 A1 * | 1/2008 | Yamada et al. | 313/498 |
| 2009/0047204 A1 * | 2/2009 | Kim et al. | 423/349 |

OTHER PUBLICATIONS

Canadian Examination Report, CA 2,691,334, Rolls-Royce Corporation, Jul. 8, 2014.

Mazumder et al., "Fabrication of 3-D Components by Laser Aided Direct Metal Deposition," Proceedings of SPIE, 5706, 38, pp. 38-59 (Mar. 2005).

European Search Report in corresponding European application (i.e., EP 08 76 8502), dated Feb. 24, 2015 (7 pages).

* cited by examiner

SYSTEM, METHOD, AND APPARATUS FOR REPAIR OF COMPONENTS

CROSS REFERENCE

The present application is a continuation-in-part of PCT/US2008/007483 filed Jun. 12, 2008 and claims the benefit of U.S. Provisional Patent Application No. 60/934,257 filed Jun. 12, 2007, each of which is incorporated herein by reference.

TECHNICAL FIELD

The technical field relates generally to repair of titanium parts and more particularly, but not exclusively, repair of titanium parts of a gas turbine engine.

BACKGROUND

The repair of titanium parts through laser deposition, such as metal powder deposition, is known in the art. However, present repair processes suffer from several drawbacks. Currently available processes do not develop a repair with appropriate micro-structure such that the repaired part area maintains the tensile strength and fatigue characteristics of an originally manufactured part. Among the issues with current repair processes, the processes develop micro-porosity in the repaired area, fail to develop sufficient microfusion with the substrate of the main part, and introduce thermal peaks and gradients in the nearby part during repair that diminish the part life of the repaired component in the area surrounding the repair. The drawbacks in currently available repair systems are particularly acute in parts that are not amenable to convenient inspection, that operate near the expected working load of the part, and/or that may cause mission failure if the part fails unexpectedly. Accordingly, there is a demand for further improvements in this area of technology.

SUMMARY

One embodiment is a unique laser metal deposition process. Other embodiments include unique methods, systems, and apparatus to repair titanium and titanium alloy components. Further embodiments, forms, objects, features, advantages, aspects, and benefits shall become apparent from the following description and drawings.

DETAILED DESCRIPTION

Figure 1:
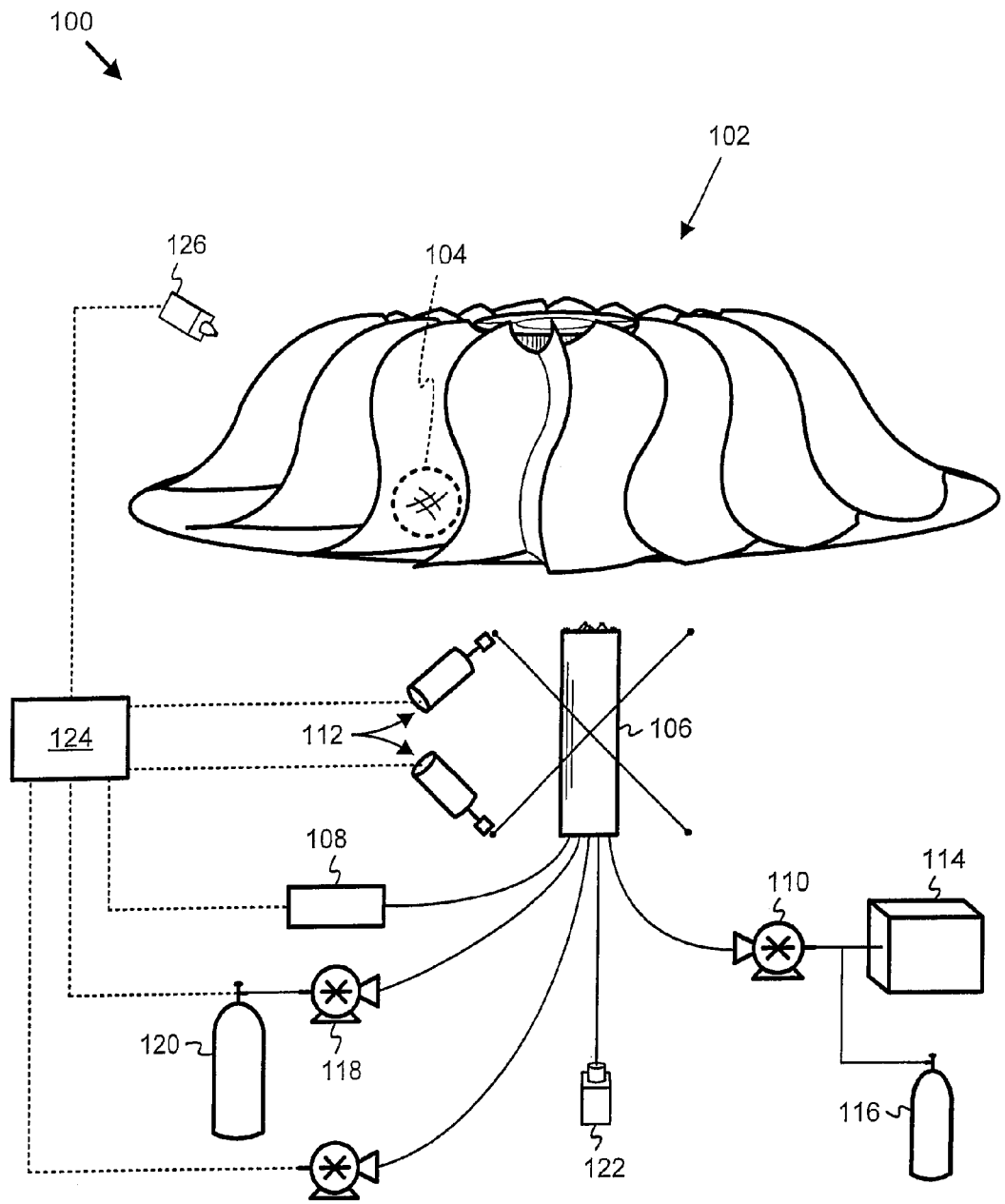
FIG. 1 is a schematic illustration of a system for repairing titanium components.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a schematic illustration of a system 100 for repairing titanium components. The system 100 includes a component 102 having titanium. The component 102 may be made out of titanium, a titanium alloy, a cermet including titanium, or other materials including titanium. In one example, the component 102 is a bladed disk ("blisk") such as used in a turbine engine. In certain embodiments, the component 102 includes a non-conforming region 104. The non-conforming region 104 may be a damaged region, a mis-manufactured region, a region with a changed specification relative to the original manufacture of the component 102, and/or a region that has not yet been manufactured wherein one step of the manufacture of the component 102 is a laser metal deposition treatment. Any non-conforming region 104 requiring material addition for any purpose is also contemplated herein.

The system 100 further includes a laser deposition device 106. Refer to the U.S. patent application entitled "System and method for component material addition," filed on Jun. 9, 2008 and incorporated by reference herein, for an example of a deposition device usable in certain embodiments of the present application. In certain embodiments, the device 106 includes a laser 108, a metal powder delivery device 110, and position actuators 112 that control the position of the deposition device 106. The position of the deposition device 106 includes an absolute position and/or a position of the deposition device 106 relative to the component 102. For example, the position actuators 112 control the position of the deposition device 106 by moving the deposition device 106, by moving the component 102, and/or by moving another object (not shown) that controls the position of the deposition device 106 and/or the component 102.

The laser deposition device 106 may utilize metal powder, metal wire, metal ribbon, and/or integral metal with the component 102 as a feed material for deposition. The laser 108 includes any laser with a sufficient power and irradiance to perform a metal powder deposition, including without limitation a $CO_2$-based laser and a neodymium-doped yttrium aluminium garnet laser (Nd:YAG). In certain embodiments, the laser 108 is an Nd:YAG laser or a fiber laser using an impregnated fiber optic cable as the gain media for the laser 108. In certain embodiments, a Nd:YAG laser produces a beam with a favorable light wavelength for melting titanium (and/or alloys) powder, reducing the complexity and improving the energy efficiency of the system 100. In certain embodiments, the laser 104 may be a solid state laser. In certain embodiments, the metal powder delivery device 110 accepts metal powder from a powder storage 114, which may be entrained in an inert carrier gas 116. In certain further embodiments, the inert carrier gas 116 is helium.

In certain embodiments, the system 100 includes a shielding device that ensures an oxygen content remains below a first threshold and that a water vapor content remains below a second threshold in a target area of the component 102. The target area includes at least the non-conforming region 104, and in certain embodiments the target area includes the entire component 102. The shielding device, in certain embodiments, includes an inert gas delivery device 118 that delivers gas from an inert gas source 120 to the non-conforming region 104 at a rate sufficient to meet the oxygen content and water vapor content thresholds. The inert gas source 120 may be argon, helium, an argon-free gas source, a shared gas source with the inert carrier gas 116, or any other inert gas source which is essentially free of oxygen and water vapor. In certain embodiments, the component 102 may further be sealed, enclosed, and/or partially sealed or enclosed in a container.

In certain embodiments, the first threshold or maximum oxygen content in the target area is about 10 part-per-million (ppm) of oxygen. In certain further embodiments, the first threshold is about 5 ppm oxygen. The allowable oxygen amount depends upon the required component strength and ductility after repair, the formulation of the component material (e.g. certain titanium alloys are more sensitive to oxygen than others). It is a mechanical step for one of skill in the art, considering the features of a specific embodiment and the disclosure herein, to determine a first threshold—for example one of skill in the art may utilize 25 ppm oxygen in the target area, and reduce the first threshold if the process yields a repair with insufficient ductility. The use of 10 ppm, or alternatively 5 ppm, provides adequate results for a wide range of titanium alloys and component 102 applications.

In certain embodiments, the second threshold may be defined as a dew point temperature, for example a dew point temperature of −55° C. (negative fifty-five degrees Celcius). The thresholds for oxygen fraction and water vapor content depend upon the material formulation of the component 102 and the powder 114 or other deposition material, and the temperature and cooling rate of the laser deposition operation. In a component, for example (but without limitation) where the component 102 will be installed in a location that is not amenable to convenient inspection, where the component 102 will operate near the expected working load of the component 102, and/or where a failure of the component 102 may cause mission failure if the component 102 fails unexpectedly, the component 102 may require high purity and a micro-structure with very little micro-porosity and good micro-fusion, and therefore the first threshold and second threshold may be set very low.

In certain embodiments, the system 100 further includes an imaging device 122 that may be structured to observe the non-conforming region 104 before and/or during a repair operation. For example, the imaging device 122 may be structured to view the non-conforming region 104 through the front of the device 102 and/or through focusing optics (not shown) of the laser 108.

In certain embodiments, the system 100 includes a processing subsystem that includes a controller 124. The controller 124 includes memory, processing, and input/output interfaces. The controller 124 further includes modules structured to perform operations for repairing a component 102. The controller 124 may be a single device or a plurality of distributed devices, and may include devices that communicate over a network, datalink, wireless communication, and the like. In certain embodiments, the controller 124 communicates with various sensors and actuators in the system 100 to send or receive information and to send commands. The communications of the controller 124 may be direct signals such as electronic, pneumatic, or hydraulic signals, or the communications may be software or datalink parameters.

In certain embodiments, the component 102 is repaired by the laser deposition device 106, and the repaired component has a performance index value greater than 70% of a new component performance index value. The performance index value comprises at least one of a tensile strength value and a fatigue performance value. In certain further embodiments, the repaired component has a performance index value greater than 90% of a new component performance index value. However, other performance index values are contemplated herein.

In certain embodiments, the controller 124 includes a tool path module, a tool position module, a deposition conditions module, a temperature determination module, and/or a temperature control module. The use of modules emphasizes the structural independence of the aspects of the controller 124, and illustrates one grouping of operations and responsibilities of the controller 124. Other groupings that execute similar overall operations are understood within the scope of the present application.

Figure 2A:
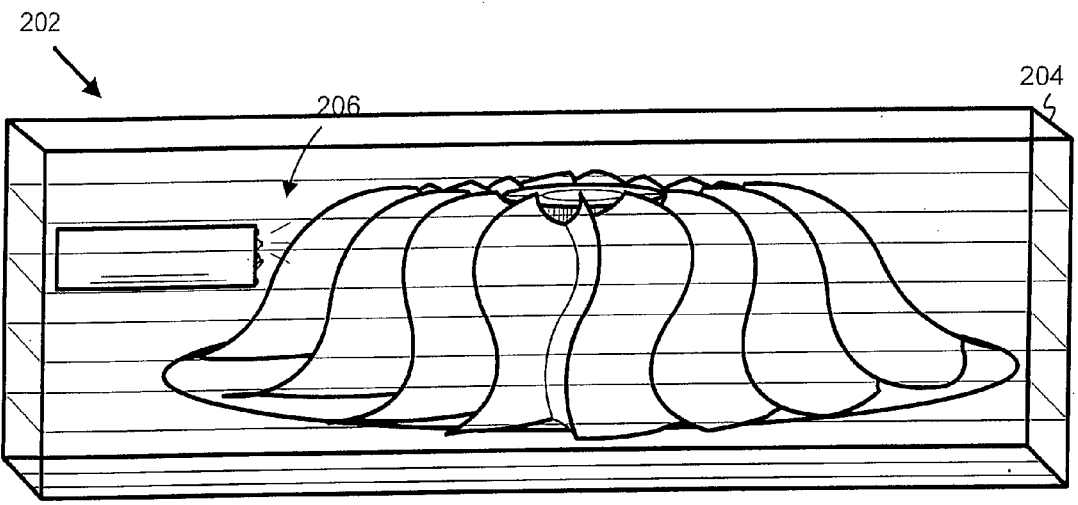
FIG. 2A is an illustration of a first shielding device.

FIG. 2 is an illustration of a first shielding device 202. The first shielding device includes a partial enclosure 204 and a flow of inert gas 206. The partial enclosure 204 reduces mass transfer in the region of the component 102 and, combined with sufficient flow of the inert gas 206 provides an oxygen content below the first threshold and a water vapor content below the second threshold.

Figure 2B:
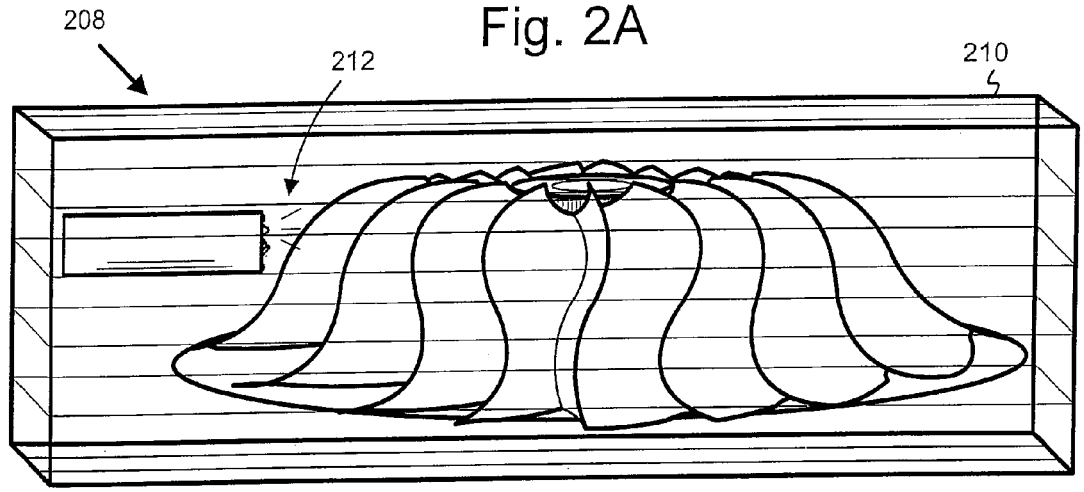
FIG. 2B is an illustration of a second shielding device.

FIG. 2B is an illustration of a second shielding device 208. The second shielding device includes a sealed enclosure 210 and a flow of inert gas 212. The sealed enclosure 210 reduces mass transfer in the region of the component 102 and, combined with sufficient flow of the inert gas 212 provides an oxygen content below the first threshold and a water vapor content below the second threshold. The use of a sealed enclosure 210 may reduce the amount of inert gas 212 required to maintain the oxygen and water vapor content requirements.

In one embodiment, the shielding device 208 is a sealed enclosure 210 filled with a first inert gas, an oxygen scavenger such as a zeolite oxygen adsorber (not shown) that removes trace oxygen from the sealed enclosure 210, and an inert gas delivery device 118 that provides a stream of a second inert gas 212. For example, the sealed enclosure 210 may slowly leak ambient air into the enclosure, and the oxygen scavenger may remove oxygen from the enclosure 210 and periodically regenerate (e.g. heating to release adsorbed oxygen) and vent trapped oxygen away from the enclosure 210.

In certain embodiments, the first inert gas includes argon and/or helium, and the second inert gas includes helium. In certain embodiments, the second inert gas may be argon and/or helium. The selection of each inert gas may depend upon cost and other commercial considerations, and further may depend upon the heat transfer characteristics of each inert gas, and especially the heat transfer characteristics of the second inert gas 212 that blows directly on the component at the deposition area.

Figure 2C:
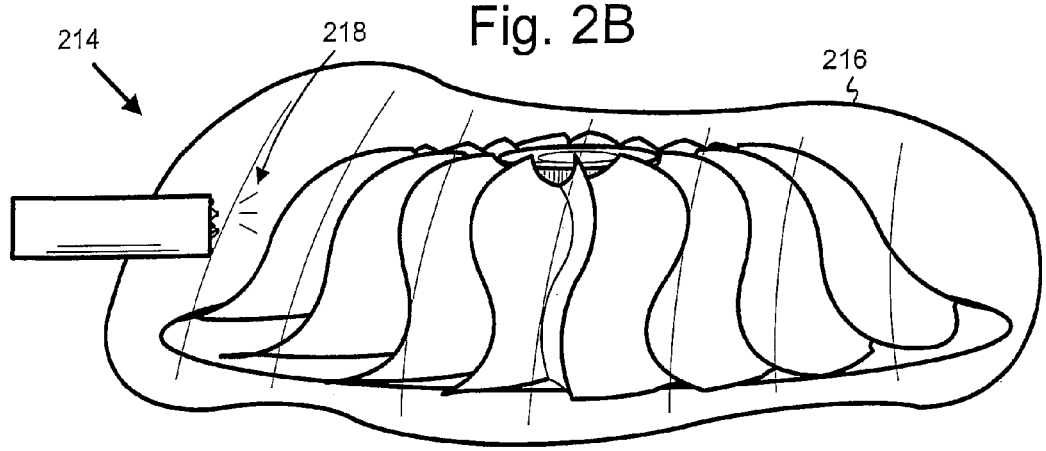
FIG. 2C is an illustration of a third shielding device.

FIG. 2C is an illustration of a third shielding device 214. The third shielding device includes a localized bagging device 216. The localized bagging device 216 reduces mass transfer in the region of the component 102 and, combined with sufficient flow of the inert gas 218 provides an oxygen content below the first threshold and a water vapor content below the second threshold. The use of a localized bagging device 216 may reduce the amount of inert gas 218 required to maintain the oxygen and water vapor content requirements.

Figure 3:
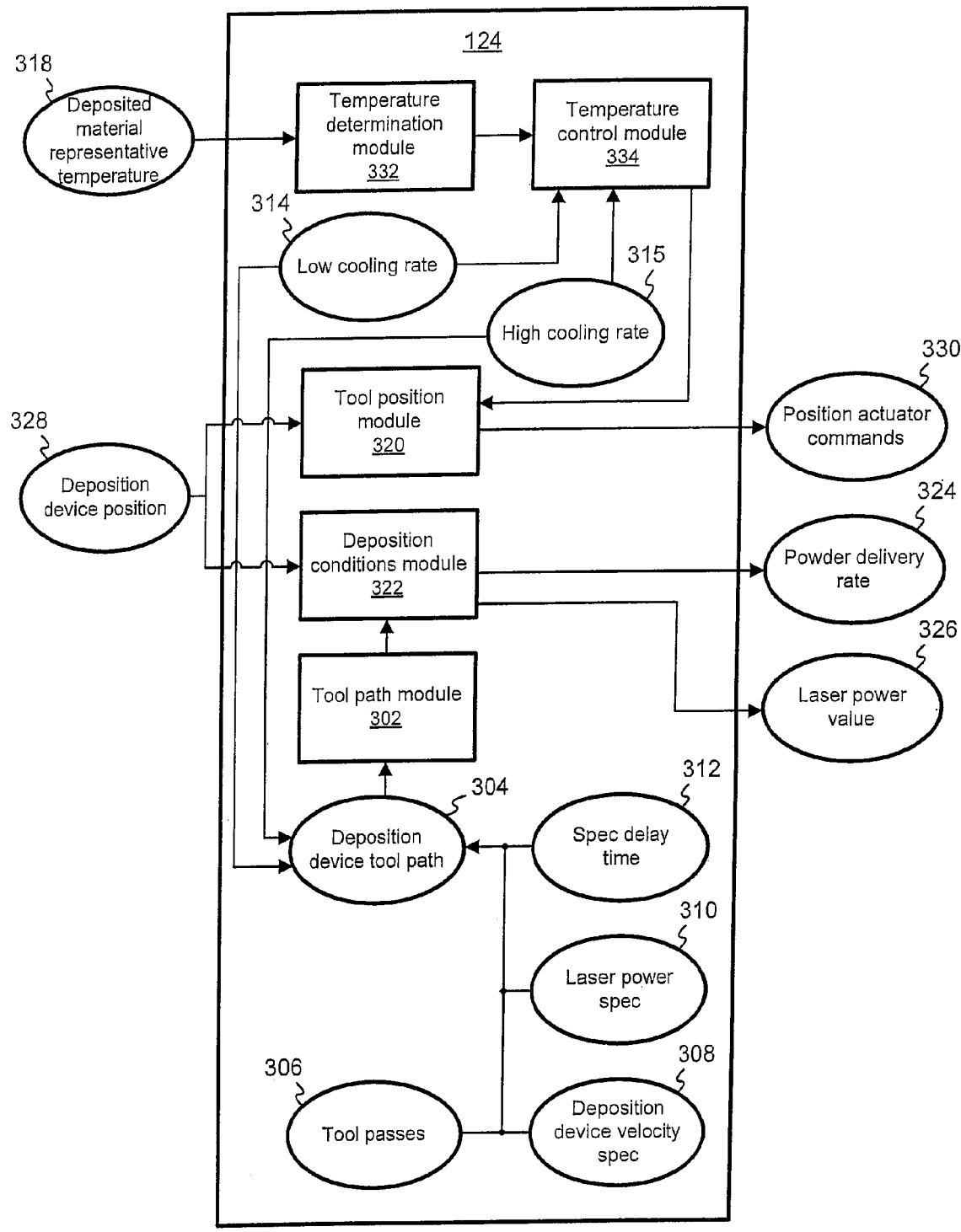
FIG. 3 is a schematic block diagram of a controller.

FIG. 3 is a schematic block diagram of a controller 124. The controller 124 includes a tool path module 302 structured to interpret a deposition device tool path 304. The tool path module 302 may interpret the deposition device tool path 304 by reading the tool path 304 from communications on a datalink, by looking up the tool path 304 from a memory location, and/or by calculating the tool path 304 based on sensed, stored, or communicated parameters. The deposition device tool path 304 includes a plurality of tool passes 306, a deposition device velocity specification 308, a laser power specification 310, and/or a specified delay time 312 between each of the plurality of tool passes 306.

In certain embodiments, the deposition device tool path 304 includes at least four tool passes 306 for each deposition layer applied in repairing the component 102. In certain further embodiments, each consecutive tool pass 306 overlaps a previous tool pass by at least 30%. The use of multiple tool passes 306 in each deposition layer, combined with other features of the deposition operations described herein, contribute to forming the desired micro-structure in the non-conforming region 104 at the completion of the deposition. In certain embodiments, the repair area after deposition meets or even exceeds the physical specifications of the base component 102, including tensile strength and wear life.

In certain embodiments, the component 102 is tested after the deposition at a stress load greater than 70% of a maximum expected stress load. For example, if the component 102 is a blisk for a turbine engine, the turbine engine may be operated at a condition that exceeds a stress load of 70% of a maximum expected stress load on the blisk—which in typical engines will be an operating point that significantly exceeds 70% of the rated turbine engine power.

In certain further embodiments, a performance index is determined for the component 102 and/or for a deposit coupon of the component 102. The deposit coupon may be material created during the deposition operation and under the same conditions as the deposition operation, where the deposit coupon may be tested for a performance index after the repair. The use of a deposit coupon allows a performance estimate of the repaired component 102 without subjecting the component 102 to wear or damage from the test, and allows more complete testing including destructive testing of the deposit coupon.

In certain embodiments, the performance index is a description representative of the component 102 tensile strength, fatigue capability, or similar characterization of the component 102 as specified for the application. In certain embodiments, it is determined whether the performance index for the component 102 exceeds a performance threshold, where the performance threshold is a threshold greater than 70% of a new component performance index. For example, the performance index may be an exhibited tensile strength of the repaired component, and the performance threshold may be a value of 70% of the tensile strength of a newly manufactured component. Depending upon the application, the performance threshold may be greater than about 90% of a new component performance index.

In certain embodiments, the deposition device velocity specification 308, the laser power specification 310, and the specified delay time 312 are configured such that the deposited metal material cools at a cooling rate between a low cooling rate 314 and a high cooling rate 315. The cooling rate of the deposited material and the presence or lack of impurities in the gases surrounding the deposition operation determine the final micro-structure of the repaired component. In certain embodiments, the development of micro-porosity and/or the development of a grain boundary alpha phase indicate a cooling rate that is too low and/or the presence of impurities. Impurities can be detected directly and can thereby be eliminated as a cause or mitigated by better removal. The cooling rate can be adjusted by changing the laser power specification 310, the specified delay time 312, the deposition device velocity specification 308, and/or the powder delivery rate 324.

The cooling rate during the deposition depends upon the deposition device velocity, the laser power utilized, the delay time between tool passes 306, the ability of the component material to absorb the laser 104 utilized (e.g. titanium absorbs Nd:YAG energy in greater percentages than a $CO_2$ based laser), and the thickness of the material (thicker material heats up more slowly and cools down more slowly). The control of the laser power utilized can be either by a direct laser power command (e.g. 175 Watts) and/or a by utilizing a pulse-width modulated (PWM) laser. For example, where a laser has a 350 Watt base power and 175 Watts are needed, a PWM duty cycle of 50% provides a net power of 175 Watts continuous.

In certain embodiments, and especially in embodiments with critical components and/or where material purity of the component 102 is important, the deposition device 102 does not include a copper chill. It is a mechanical step for one of skill in the art to control the available parameters in light of the fixed parameters and the disclosure herein. For example, the component thickness is generally not a controllable parameter because the component 102 design is typically, but not necessarily, specified before the deposition device tool path 304 is determined. Similarly, the type of laser and component material, and therefore the absorption coefficient, is typically specified before the deposition device tool path 304 is determined.

The laser power specification 310 can be calculated in real-time, and changed during operations based on, for example, a deposited material representative temperature 318 provided by a temperature sensor 126 (refer to FIG. 1). The deposition device tool path 304 may be calculated before operations begin, may be determined at least partially in a "teach-and-learn" operation where an operator controls the deposition device 102 through the spatial path to be followed during deposition operations while the controller 124 records the spatial parameters, and may further be adjusted based on calculated or measured parameters during deposition operations.

The controller 124, in certain embodiments, includes a tool position module 320 that controls the position actuators 112 in response to the deposition device tool path 304. In certain embodiments, the tool position module 320 interprets a current deposition device position 328 and provides position actuator commands 330. The controller 124 further includes a deposition conditions module 322 that controls a powder delivery rate 324 and a laser power value 326 in response to the deposition device tool path 304 and the deposition device position 328.

For example, the deposition device tool path 304 may specify a variable laser power value along a length of the tool passes 306, and the deposition conditions module 322 provides the specified laser power value at each position 328 according to the deposition device tool path 304. In certain further embodiments, the deposition device velocity specification 308 may likewise vary along a length of the tool pass 306. Further, the laser power value 326 and the deposition device velocity specification 308 may vary from one tool pass 306 to a later tool pass 306. As described, the laser power value 326 depends upon many factors and tradeoffs, but generally a laser power value 326 greater than 50 Watts will provide sufficient power for deposition as described. In certain embodiments, the laser 104 has a power output between about 50 Watts and about 2,000 Watts, although higher values may be utilized in certain embodiments. In certain further embodiments a laser power value 326 is below about 500 Watts.

In certain embodiments, the controller 124 includes a temperature determination module 332 that interprets the deposited material representative temperature 318. The temperature determination module 332 interprets the deposited material representative temperature 318 by reading a value from a sensor 126, by reading a value from a memory location, by interpreting an electronic signal such as a voltage, and/or by calculating the deposited material representative temperature 318 utilizing other parameters available in the system 100.

The deposited material representative temperature 318 may be any temperature in the system 100 indicative of the temperature of the deposited material, including a melt pool temperature and/or temperature of the component 102 at a location in some thermal contact with the deposited material. The deposited material representative temperature 318 may generally be correlated to the cooling rate of the deposited material—for example a higher peak temperature generally provides a lower cooling rate, and the cooling rate of the deposited material may be directly tracked in a feedback manner utilizing the deposited material representative temperature 318. The temperature and/or cooling rate of the deposited material may be correlated to the deposited material representative temperature 318 by a function, a lookup table based on several sample data points, or through similar methods understood in the art.

In certain further embodiments, the controller 124 includes a temperature control module 334 that interprets a low cooling rate 314 and a high cooling rate 315, and the tool position module 320 controls the position actuators 112 in response to the deposited material representative temperature 318 and the low cooling rate 314 and a high cooling rate 315. For example, the tool position module 320 may issue position actuator commands 330 to decrease the velocity of the deposition device 102 in response to the deposited material representative temperature 318 indicating that the deposited material cooling rate is approaching the high cooling rate 315. In certain further embodiments, the deposition conditions module 322 controls the powder delivery rate 324 and/or the laser power value 326 in response to the deposited material representative temperature 318 and the low cooling rate 314 and a high cooling rate 315. For example, the deposition conditions module 322 may increase the powder delivery rate 324 and/or increase the laser power value 326 in response to the indicating that the deposited material cooling rate is approaching the high cooling rate 315.

Figure 4:
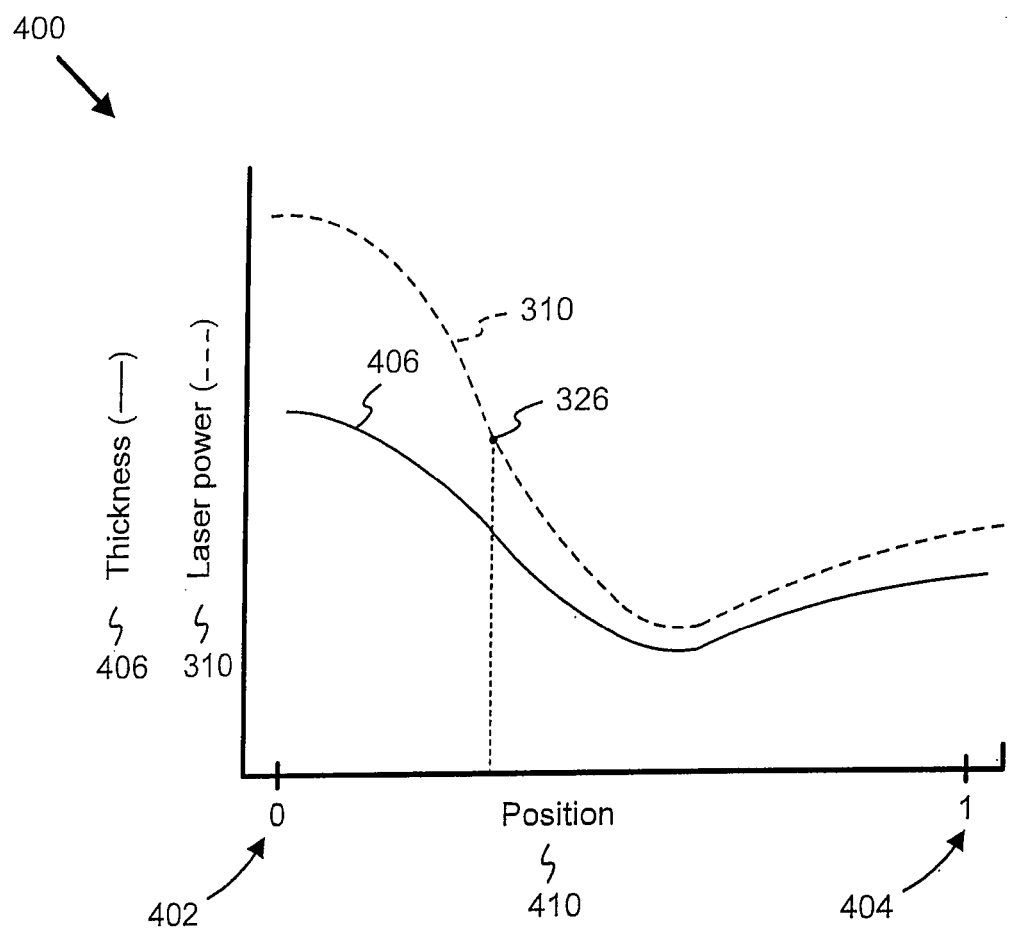
FIG. 4 is an illustration of a component thickness and laser power value associated with an axial position of a non-conforming area.
Figure 4:
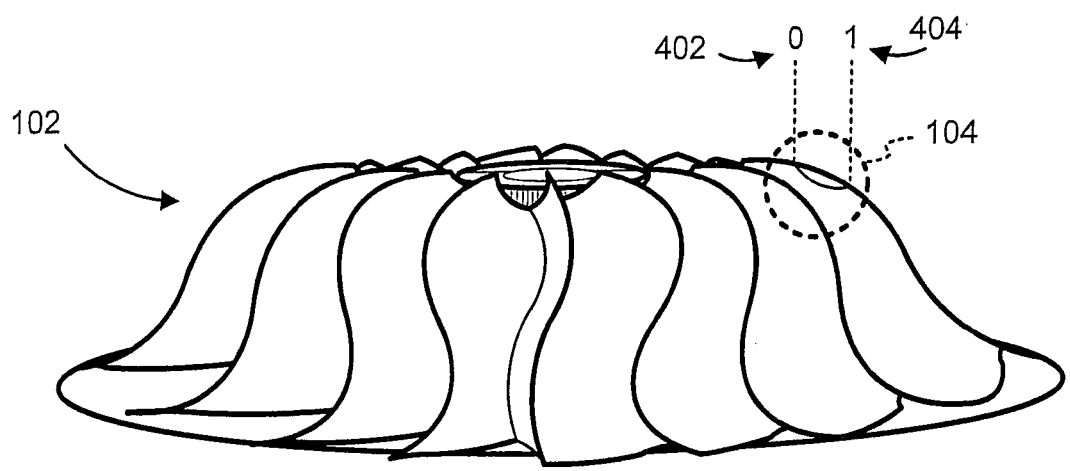

FIG. 4 is an illustration 400 of a component thickness 406 and laser power value 310 associated with an axial position 410 of a non-conforming area 104. The deposition device tool path 304 may provide a laser power value specification 310 which, in one example, is provided as a laser power value 326 as a function of an axial position 410 through the non-conforming area 104. The non-conforming area 104 includes a first axial end 402 and a second axial end 404, with values for the laser power value 326 specified throughout. The laser power value specification 310 may be a nominal specification, adjusted by the temperature sensor 126 feedback, for example. The thickness curve 406 is shown for illustration of how the material thickness of the component 102 may vary through the non-conforming region. Further, the thickness curve 406 may vary with each subsequent deposition layer (not shown) as the contours of the built-up component 102 change.

Figure 5:
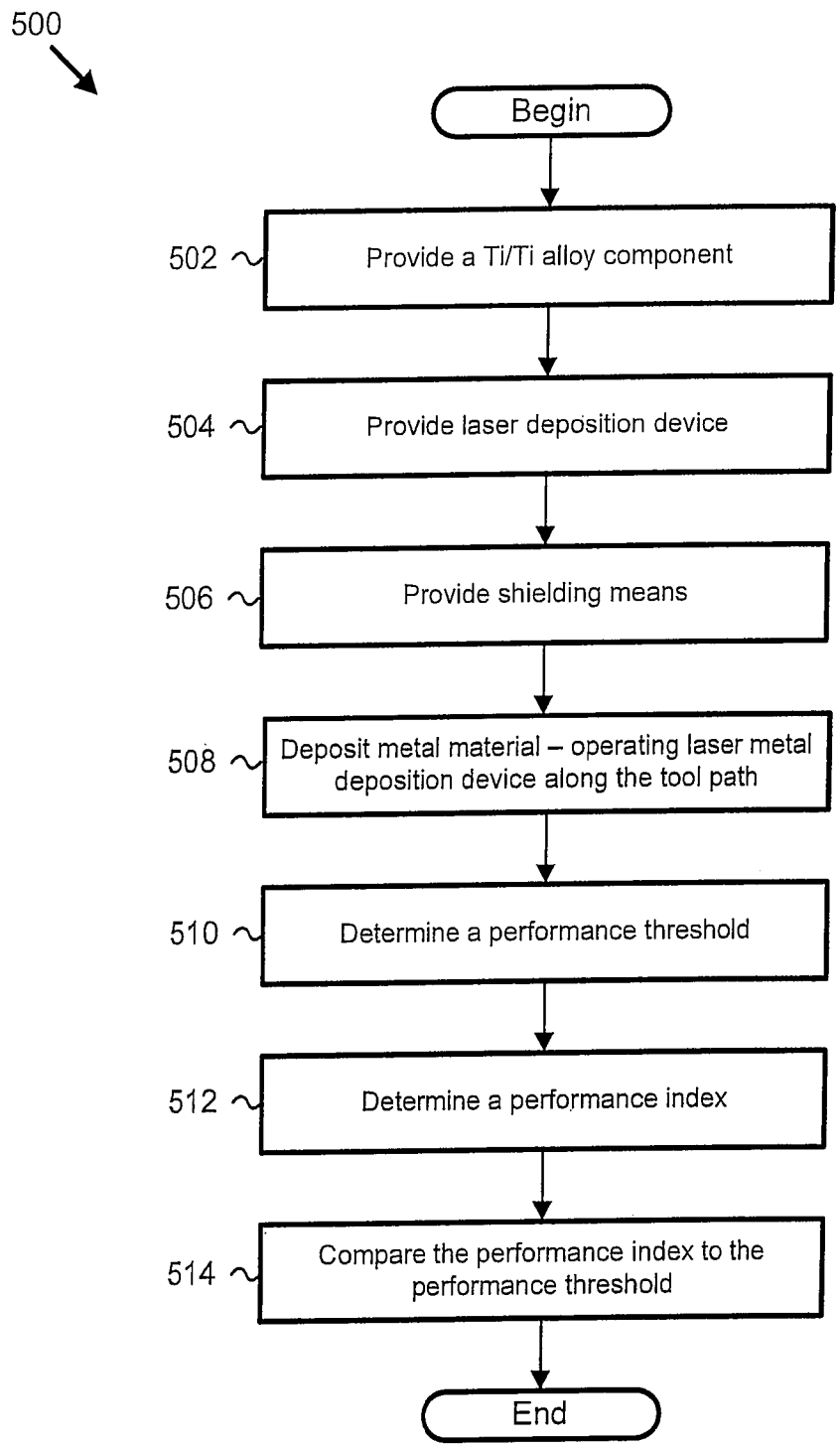
FIG. 5 is a schematic flow chart diagram illustrating a procedure for repairing a titanium component.

FIG. 5 is a schematic flow chart diagram illustrating a procedure 500 for repairing a titanium component 102. The procedure 500 includes an operation 502 to provide a titanium and/or titanium alloy component. The procedure 500 further includes an operation to provide laser deposition device 102. The procedure 500 further includes an operation 506 to provide a shielding means. The procedure 500 further includes an operation 508 to deposit a metal powder on the component by operating a laser deposition device 102 along a tool path 304. In certain embodiments, the procedure 500 includes an operation 510 to determine a performance threshold, an operation 512 to determine a performance index, and an operation 514 to compare the performance index to the performance threshold.

Figure 6:
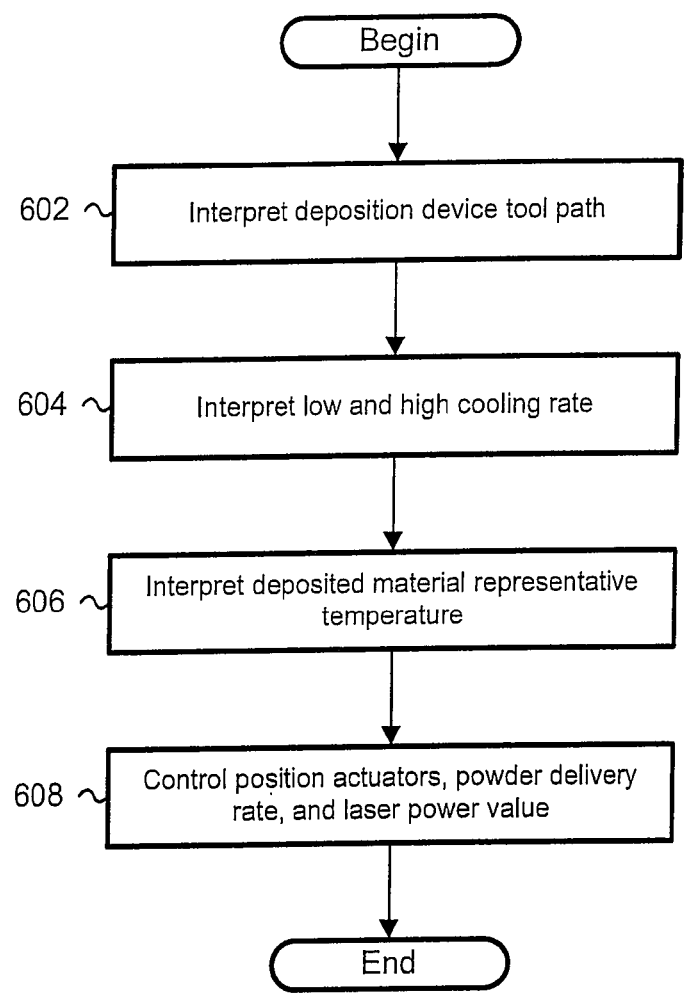
FIG. 6 is a schematic flow chart diagram illustrating operations of a controller.

FIG. 6 is a schematic flow chart diagram illustrating an operating process 600 of a controller 124. The process 600 includes an operation 602 to interpret a deposition device tool path 304 and an operation 604 to interpret a low cooling rate 314 and a high cooling rate 315. The process 600 further includes an operation 606 to interpret a deposited material representative temperature 318. The process 600 further includes an operation 608 to control position actuators 112, to control a powder delivery rate 324, and/or to control the laser power value 326 in response to the deposition device tool path 304, the low cooling rate 314 and a high cooling rate 315, and the melting pool temperature 318.

As is evident from the figures and text presented above, a variety of embodiments according to the present invention are contemplated.

A method is disclosed including operations for repairing a component. The method includes providing a component including one of titanium and a titanium alloy, providing a laser deposition device, and a shielding the component to ensure an oxygen content remains below a first threshold and that a water vapor content remains below a second threshold in a target area of the component. The method further includes depositing a metal material on the component, wherein the depositing includes operating the deposition device along a tool path including a plurality of tool passes, wherein the tool path further comprises a deposition device velocity specification, a laser power specification, and may further include a specified delay time between each of the plurality of tool passes. In certain embodiments, the method further includes testing the component at a stress load greater than 70% of a maximum expected stress load.

In certain embodiments, the component comprises a bladed disk. In certain embodiments, the laser has a power output between about 50 Watts and 2,000 Watts, and in certain further embodiments includes a power output below about 500 Watts. In certain embodiments, the laser is a solid state laser, a fiber laser, and/or an Nd:YAG laser.

In certain embodiments, the tool path includes at least four tool passes for each of at least one deposition layer. In certain embodiments, each of the plurality of tool passes overlays a previous tool path by at least 30%. In certain embodiments, the laser power specification includes a variable laser power value along a length of at least one of the tool passes. In certain embodiments, the deposition device velocity specification, a laser power specification, and a specified delay time between each of the plurality of tool passes are configured such that the deposited metal material cools at a cooling rate between a low cooling rate and a high cooling rate.

In certain embodiments, the shielding means includes a helium gas stream, a localized bagging device, a partial enclosure, and/or a sealed enclosure. In certain embodiments, the first threshold is not greater than about 10 ppm, and in certain further embodiments not greater than about 5 ppm. In certain further embodiments, the second threshold includes a dew point of about −55° C. In certain embodiments, the shielding means includes an argon-free inert gas delivery means.

A system is disclosed including a component including titanium, where the component has a non-conforming region. The system further includes a laser deposition device including a laser, a metal powder delivery device, and a plurality of position actuators structured to control a position of the deposition device. The system further includes a shielding means that ensures an oxygen content remains below a first threshold and that a water vapor content remains below a second threshold in a target area of the component. In certain embodiments, the system includes a controller having modules configured to functionally execute operations to repair the component.

In certain embodiments, the controller includes a tool path module structured to interpret a deposition device tool path, where the deposition device tool path includes a plurality of tool passes, a deposition device velocity specification, a laser power specification, and a specified delay time between each of the plurality of tool passes. In certain further embodiments, the controller includes a tool position module structured to control the position actuators in response to the deposition device tool path, and a deposition conditions module structured to control a powder delivery rate and a laser power value in response to the deposition device tool path and the deposition device position.

In certain embodiments of the system, the deposition device does not include a copper chill. In certain further embodiments, the laser having a power output between about 50 Watts and 2,000 Watts, and in certain embodiments the laser has a power output below about 500 Watts. In certain embodiments, the laser is a solid state laser, a fiber optic laser, and/or an Nd:YAG laser.

In certain embodiments, the controller further includes a temperature determination module structured to interpret a deposited material representative temperature and a temperature control module structured to interpret a low cooling rate and a high cooling rate, and the tool position module is further structured to control the position actuators in response to the deposited material representative temperature and the low cooling rate and a high cooling rate. In certain embodiments, the controller further includes a temperature determination module structured to interpret a deposited material representative temperature, and a temperature control module structured to interpret a low cooling rate and a high cooling rate, and the deposition conditions module is further structured to control the powder delivery rate and/or the laser power value in response to the deposited material representative temperature and the low cooling rate and a high cooling rate.

An apparatus is disclosed including a laser deposition device including a laser, a metal material delivery device, and a plurality of position actuators structured to control a position of the deposition device. The apparatus further includes shielding means that ensures an oxygen content remains below a first threshold and that a water vapor content remains below a second threshold in a target area of the component. In certain embodiments, the apparatus includes a controller having a plurality of modules to functionally execute a procedure to repair a component.

In certain embodiments, the controller includes a tool path module structured to interpret a deposition device tool path, where the deposition device tool path includes a plurality of tool passes, a deposition device velocity specification, a laser power specification, and a specified delay time between each of the plurality of tool passes. In certain further embodiments, the controller includes a tool position module structured to control the position actuators in response to the deposition device tool path, and a deposition conditions module structured to control a powder delivery rate and a laser power value in response to the deposition device tool path and the deposition device position.

In certain embodiments, the shielding means includes a helium gas stream, a localized bagging device, a partial enclosure, and a sealed enclosure. In certain embodiments, the shielding means includes an argon-free inert gas delivery means. In certain embodiments, the deposition device velocity specification, the laser power specification, and the specified delay time between each of the plurality of tool passes are configured such that the deposited metal material cools at a cooling rate between a low cooling rate and a high cooling rate.

In certain embodiments, the tool path further includes at least four tool passes for each of at least one deposition layer. In certain further embodiments, each of the plurality of tool passes overlays a previous tool path by at least 30%.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for repairing a component through laser deposition, the method comprising:
   providing the component for repair, the component comprising a material selected from the group consisting of titanium and a titanium alloy;
   providing a laser metal powder deposition device;
   enclosing the component in a shielding device;
   delivering a flow of inert gas to the shielding device to ensure an oxygen content remains below a first threshold and that a water vapor content remains below a second threshold in a target area of the component; and
   depositing a metal material on the component, wherein the depositing comprises operating the laser deposition device along a tool path including a plurality of tool passes, delivering the metal material at a deposition device velocity specification, and heating the metal material at a laser power specification,
   wherein the laser power specification is calculated in real-time during the depositing and changed during operations based on a deposited material representative temperature provided by a temperature sensor, and wherein a respective deposition layer of the metal material is formed by performing multiple tool passes and each consecutive tool pass of the multiple tool passes overlaps a previous tool pass of the multiple tool passes in the respective deposition layer by at least 30%.

2. The method of claim 1, wherein the tool path further comprises a specified delay time between each of the plurality of tool passes.

3. The method of claim 1, wherein the component comprises a bladed disk.

4. The method of claim 1, wherein the deposition device includes a laser having a power output between about 50 Watts and 2,000 Watts.

5. The method of claim 1, wherein the laser further includes a power output below about 500 Watts.

6. The method of claim 1, wherein the laser is a solid state laser.

7. The method of claim 1, wherein the laser includes at least one of a fiber laser and an Nd:YAG laser.

8. The method of claim 1, wherein the tool path further comprises at least four tool passes for each of at least one deposition layer.

9. The method of claim 1, further comprising testing the component at a stress load greater than 70% of a maximum expected stress load.

10. The method of claim 1, further comprising determining a performance index at least one of the component and a deposit coupon of the component, and determining whether the performance index is greater than a performance threshold, wherein the determining the performance index comprises implementing at least one test selected from a tensile strength test and a fatigue cycle test.

11. The method of claim 1, wherein the first threshold is not greater than about 10 ppm.

12. The method of claim 1, wherein the first threshold is not greater than about 5 ppm.

13. The method of claim 1, wherein the second threshold is a dew point of about −55° C.

14. The method of claim 2, wherein the deposition device velocity specification, a laser power specification, and the specified delay time between each of the plurality of tool passes are configured such that the deposited metal material cools at a cooling rate between a low cooling rate and a high cooling rate.

15. The method of claim 10, wherein the performance threshold comprises a threshold greater than about 70% of a new component performance index.

16. The method of claim 10, wherein the performance threshold comprises a threshold greater than about 90% of a new component performance index.

17. The method of claim 14, wherein the cooling rate comprises a cooling rate that prevents an appearance of a grain boundary alpha phase.

18. The method of claim 1, wherein the laser power specification comprises a duty cycle for a pulse-width modulated laser.

19. An apparatus for repairing a component through laser deposition, comprising:
 a laser metal powder deposition device to repair a component, the laser metal power deposition device including a laser, a metal powder delivery device, and a plurality of position actuators structured to control a position of the laser deposition device;
 an enclosure configured to enclose the component and receive a flow of an inert gas that ensures an oxygen content remains below a first threshold and that a water vapor content remains below a second threshold in a target area of the component within the enclosure; and
 a controller, comprising:
  a tool path module structured to interpret a deposition device tool path, wherein the deposition device tool path includes a plurality of tool passes, a deposition device velocity specification, and a laser power specification;
  a tool position module structured to control the position actuators in response to the deposition device tool path; and
  a deposition conditions module structured to control a powder delivery rate and a laser power value in response to the deposition device tool path and a deposition device position;
  a temperature determination module structured to interpret a deposited material representative temperature during a laser deposition process; and
  a temperature control module structured to interpret a high cooling rate and a low cooling rate.

20. The apparatus of claim 19, wherein the tool path further comprises a specified delay time between each of the plurality of tool passes.

21. The apparatus of claim 19, wherein the shielding means includes a sealed enclosure filled with a first inert gas, an oxygen scavenging means that removes trace oxygen from the sealed enclosure, and a gas delivery means that provides a stream of a second inert gas.

22. The apparatus of claim 19, wherein the first threshold is not greater than about 10 ppm.

23. The apparatus of claim 19, wherein the second threshold is a dew point of about −55° C.

24. The apparatus of claim 19, wherein the tool path further comprises at least four tool passes for each of at least one deposition layer.

25. The apparatus of claim 19, further comprising a component repaired by the laser deposition device, wherein the repaired component has a performance index value greater than 70% of a new component performance index value, wherein the performance index value comprises at least one of a tensile strength value and a fatigue performance value.

26. The apparatus of claim 19, further comprising a component repaired by the laser deposition device, wherein the repaired component has a performance index value greater than 90% of a new component performance index value, wherein the performance index value comprises at least one of a tensile strength value and a fatigue performance value.

27. The apparatus of claim 19, wherein the tool position module is further structured to control the position actuators in response to the deposited material representative temperature and the high cooling rate and the low cooling rate.

28. The apparatus of claim 19, wherein the deposition conditions module is further structured to control the powder delivery rate and/or the laser power value in response to the deposited material representative temperature and the high cooling rate and the low cooling rate.

29. The apparatus of claim 21, wherein the oxygen scavenging means includes a zeolite oxygen absorber.

30. The apparatus of claim 21, wherein the first inert gas comprises one of argon and helium, and wherein the second inert gas comprises helium.

31. The apparatus of claim 20, wherein the deposition device velocity specification, the laser power specification, and the specified delay time between each of the plurality of tool passes are configured such that the deposited metal material cools at a cooling rate between a low cooling rate and a high cooling rate.

32. An apparatus for repairing a component through laser deposition, comprising:
   a laser metal powder deposition device to repair a component, the laser metal powder deposition device including a laser, a metal powder delivery device, and a plurality of position actuators structured to control a position of the laser deposition device;
   a deposition material cooling control means structured to control a cooling rate of a deposited material such that the deposited material does not form micro-porosity and does not form a grain boundary alpha phase, wherein the deposition material cooling control means includes:
   a shielding means including an enclosure configured to enclose the component and receive a flow of an inert gas that ensures an oxygen content remains below a first threshold and that a water vapor content remains below a second threshold in a target area of the component within the enclosure; and
   a controller that includes:
      a tool path module structured to interpret a deposition device tool path, wherein the deposition device tool path includes a plurality of tool passes, a deposition device velocity specification, and a laser power specification;
      a tool position module structured to control the position actuators in response to the deposition device tool path;
      a deposition conditions module structured to control a powder delivery rate and a laser power value in response to the deposition device tool path and a deposition device position;
      a temperature determination module structured to interpret a deposited material representative temperature during a laser deposition process; and
      a temperature control module structured to interpret a high cooling rate and a low cooling rate.

33. The apparatus of claim 32, wherein the tool position module is further structured to control the position actuators in response to the deposited material representative temperature and the high cooling rate and the low cooling rate.

34. The apparatus of claim 32, wherein the deposition conditions module is further structured to control the powder delivery rate and/or the laser power value in response to the deposited material representative temperature and the high cooling rate and the low cooling rate.

* * * * *